United States Patent [19]

Dean et al.

[11] Patent Number: 5,094,109
[45] Date of Patent: Mar. 10, 1992

[54] PRESSURE TRANSMITTER WITH STRESS ISOLATION DEPRESSION

[75] Inventors: Michael J. Dean, St. Paul; Lee A. Mattison, Minneapolis, both of Minn.; Terrance F. Krouth, Green Bay, Wis.

[73] Assignee: Rosemount Inc., Eden Prairie, Minn.

[21] Appl. No.: 624,339

[22] Filed: Dec. 6, 1990

[51] Int. Cl.$^5$ ............................. G01L 7/08; G01L 9/12
[52] U.S. Cl. ...................................... 73/718; 73/706; 361/283
[58] Field of Search .................. 73/718, 717, 719, 720, 73/721, 722, 716, 723, 724, 725, 726, 727, 728, 708, 706, 756, 753, 754; 338/4, 42; 361/283; 336/30

[56] References Cited

U.S. PATENT DOCUMENTS

| | | | |
|---|---|---|---|
| 2,999,385 | 9/1961 | Wolfe | 73/718 |
| 3,140,613 | 7/1964 | Hasegawa | 73/708 |
| 4,073,191 | 2/1978 | Saigusa | 73/718 |
| 4,168,517 | 9/1979 | Lee | 361/283 |
| 4,388,833 | 6/1983 | Kuwayama | 73/718 |
| 4,800,758 | 1/1989 | Knecht et al. | 73/727 |
| 4,852,466 | 8/1989 | Freeman et al. | 92/104 |
| 4,905,575 | 3/1990 | Knecht et al. | 92/103 |

Primary Examiner—Donald O. Woodiel
Attorney, Agent, or Firm—Kinney & Lange

[57] ABSTRACT

A pressure transmitter has a pressure transducer in a transmitter housing. The transmitter housing includes a groove or a notch defining a flexure closely proximate a housing outer rim. The outer rim receives a large clamping force from a flange and is deflectable about the flexure for reducing transmission of axial and radial components of the clamping force from the housing outer rim to the transducer, which forces can cause distortions to the pressure transducer. Unevenly distributed clamping forces caused by differential thermal expansion of the flange, bolts and housing, are isolated from the transducer thereby reducing measurement errors. Further, transmission of hysteretic radial forces from the transmitter housing to the transducer caused by friction when the flange slides across the pressure transmitter housing, each having different thermal coefficients of expansion, is also reduced. Several types of pressure transducers including capacitive cell transducers can be in the transmitter housing for providing a pressure output indicative of line and differential pressure.

21 Claims, 6 Drawing Sheets

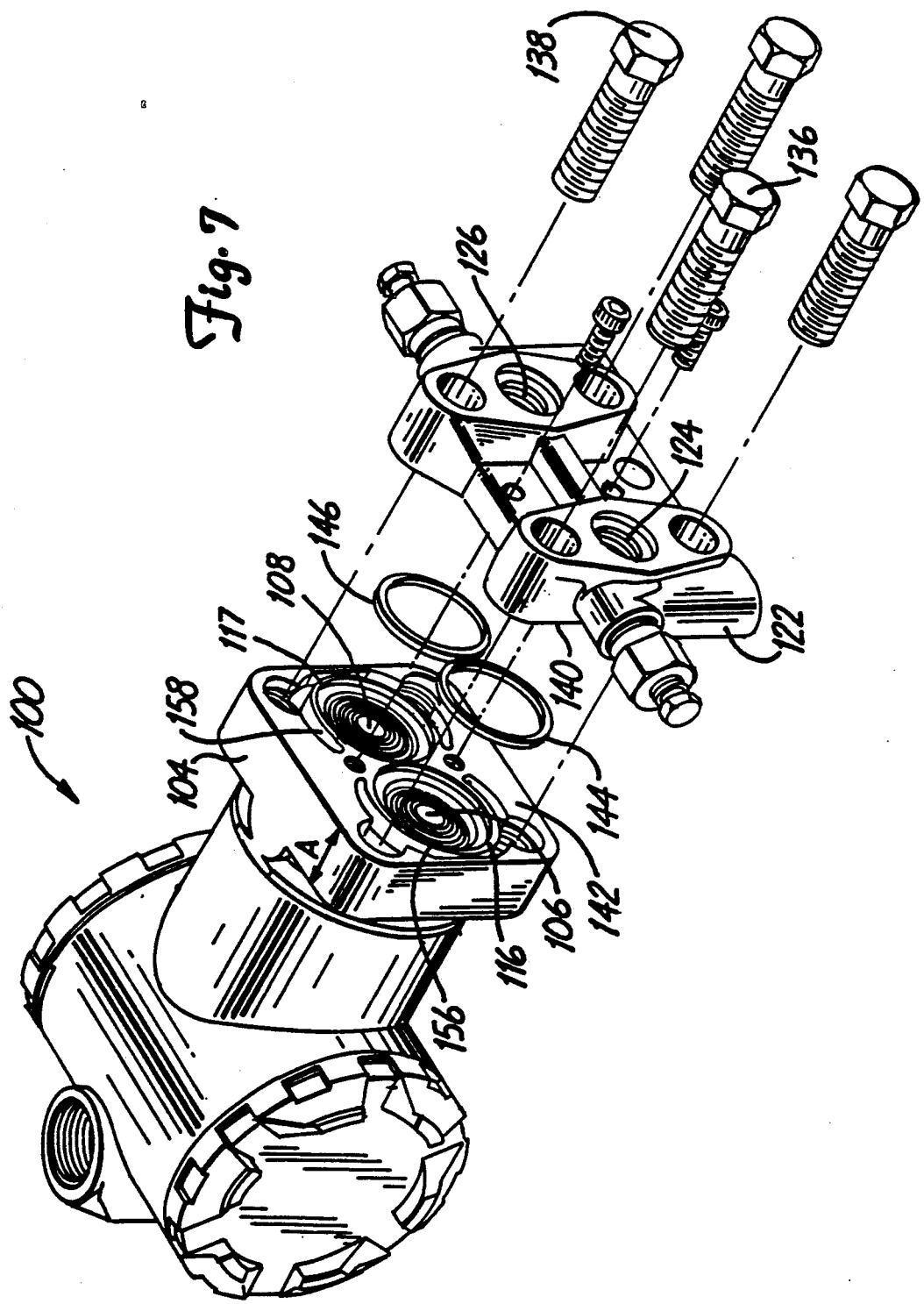

PRESSURE TRANSMITTER WITH STRESS ISOLATION DEPRESSION

BACKGROUND OF THE INVENTION

The present invention relates to a pressure transmitter having a housing designed to reduce transmission of axial and radial clamping forces from the housing to a pressure transducer therein. Clamping forces are created by flanges urged against the housing, and can be uneven and hysteretic due to differential thermal expansion between the flanges, bolts and housing.

The need to reduce clamping forces distorting pressure transducers disposed within pressure transmitter housings has brought about improvements of pressure transmitter housings and methods for coupling fluid pressure to the pressure transducer. Flanges sealingly coupling fluid pressure to the pressure transducer typically apply large clamping forces to the pressure transmitter housing, known as preloading, which clamping forces can significantly distort the pressure transducer causing measurement errors.

Typically, large clamping forces are created by bolts urging the flanges toward the transmitter housing. These bolts are usually torqued to produce clamping forces in excess of 3000 pounds to preload the flange to the pressure transmitter housing, ensuring the flange remains sealingly coupled to an isolator diaphragm when coupling high fluid pressures.

Further, the transmitter housing, flanges and bolts typically comprise different materials having different thermal coefficients of expansion which create varying and unevenly distributed axial and radial components in clamping forces due to differential expansion and contraction of the flanges, housing and bolts over a temperature range.

Furthermore, slipping action between contiguous surfaces of the flange and the housing can generate radial components in clamping forces due to friction. The radial components are hysteretic versus temperature due to the flange slipping across the housing.

A pressure transmitter housing that substantially reduces transmission of large and unevenly distributed axial and radial clamping forces from the housing to a pressure transducer disposed therein is desirable. Further, a transmitter housing which reduces transmission of hysteretic radial clamping forces due to friction between contiguous surfaces of the housing and the flange due to temperature variations of the flange, housing and bolts is desirable.

SUMMARY OF THE INVENTION

The present invention relates to a flexure means disposed between an outer rim and inner rim of a transmitter housing such that the outer rim is deflectable about the flexure means for reducing transmission of hysteretic radial and axial clamping forces applied to the outer rim by a flange from the outer rim to a means for sensing pressure disposed in the housing.

The invention comprises a pressure transmitter for measuring fluid pressure from a pressure source has a housing having a housing outer rim encompassing a housing inner rim, the housing inner rim defining a housing opening. Means for sensing pressure residing in the housing provides a sensor output and has a pressure sensor coupled to the housing opening. Flange means for coupling the fluid pressure to the pressure sensor has a flange outer rim abutting the corresponding housing outer rim, where the flange means also has a flange inner rim facing the corresponding housing inner rim and defining a recess therebetween. The flange means has a passageway communicating the fluid pressure from a first flange opening defined in the flange means to a second flange opening defined by the flange inner rim, where the second flange opening couples the fluid pressure to the means for sensing pressure. Sealing means is disposed in the recess for sealing the housing inner rim to the flange inner rim. Securing means is coupled to the flange means for securing the flange outer rim and the housing outer rim together such that the housing outer rim receives a securing force from the flange outer rim and the housing inner rim receives a sealing force from the flange inner rim via the sealing means. Flexure means defined by at least one depression is disposed in the housing between the housing inner rim and the housing outer rim for reducing transmission of the securing force from the housing outer rim to the means for sensing pressure.

In a preferred embodiment of the invention, the housing outer rim is deflectable about the flexure means for reducing distortions of the means for sensing pressure. In yet another embodiment of the invention the flexure means is defined by a groove or a notch proximate the housing outer rim.

Pressure transmitters such as differential, absolute, and gauge are suitable for implementing this invention to reduce distortions to a pressure transducer disposed therein. Several types of pressure transducers can be employed including strain gauge, optical and conductive plate capacitance cells.

BRIEF DESCRIPTION OF THE DRAWINGS

FIG. 7 is an exploded perspective view of a portion of the second embodiment.

DETAILED DESCRIPTION OF THE INVENTION

Figure 1A:
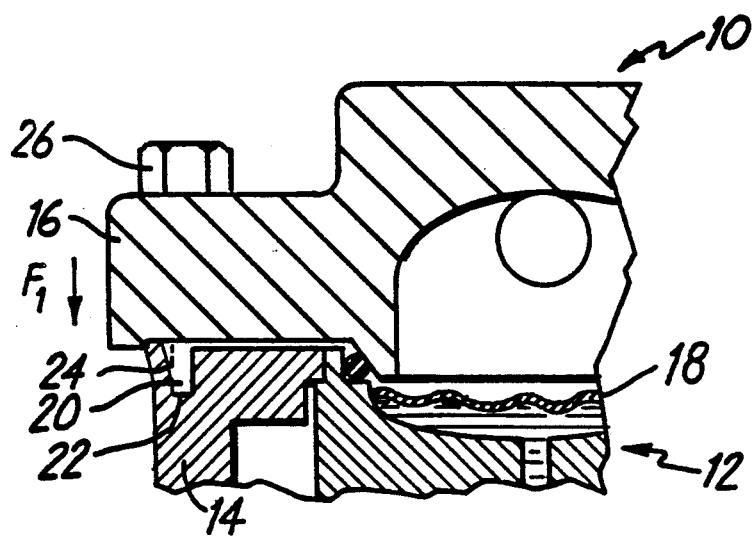
FIGS. 1A, 1B and 1C show cross sectional views of portions of pressure transmitters according to the invention.
Figure 1B:
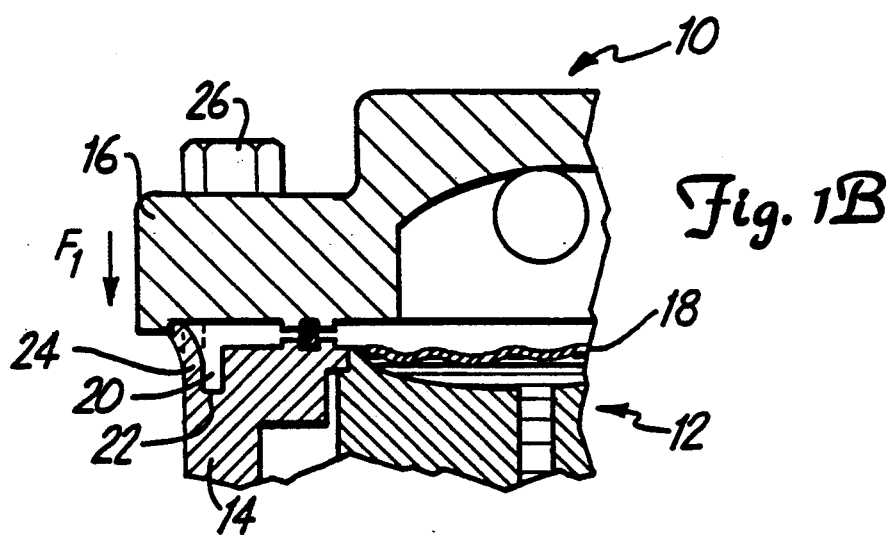
Figure 1C:
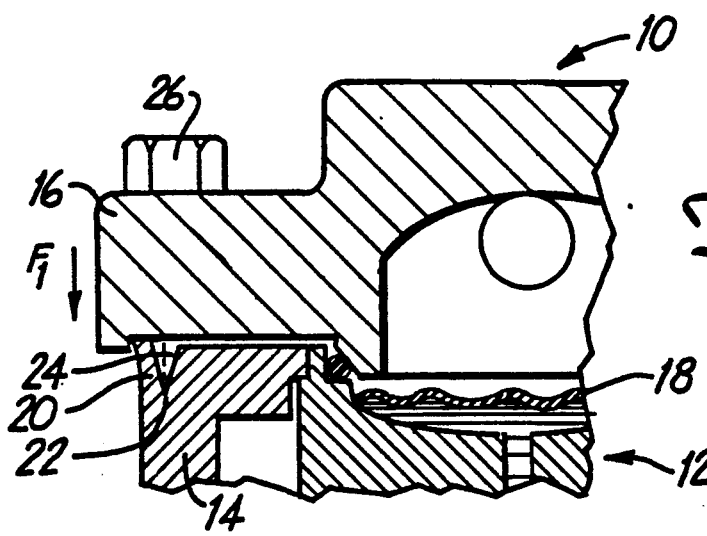

In FIGS. 1A, 1B and 1C several embodiments of a portion of a pressure transmitter 10 are shown, each comprising a sensing transducer 12 residing in transmitter housing 14. As will be described in more detail below, sensing transducer 12 converts a fluid pressure received from flange 16 to an electrical output representative of the pressure. Annular depression 20, such as a groove or a notch, is disposed in housing 14 defining flexure region 22 and outer rim 24. Bolt 26 urges flange 16 against outer rim 24 to preload flange 16, creating a large axial clamping force $F_1$ in outer rim 24. Flange 16 and housing 14, comprising materials having different thermal coefficients of expansion, expand and contract differently over a temperature range. This differential expansion and contraction causes an axial and radial component of clamping force $F_1$ to vary and be unevenly distributed to housing 14 over the temperature range. This differential expansion and contraction also creates a hysteretic radial component in clamping force $F_1$ due to friction between a contiguous surface of flange 16 sliding on housing 14, as will be described in detail below. Outer rim 24 deflects outward about flexure region 22 thus reducing transmission of both axial and radial components of clamping force $F_1$ from outer rim 24 to sensing transducer 12 such that the electrical output of the sensing transducer is more representative of actual differential pressure.

Figure 2:
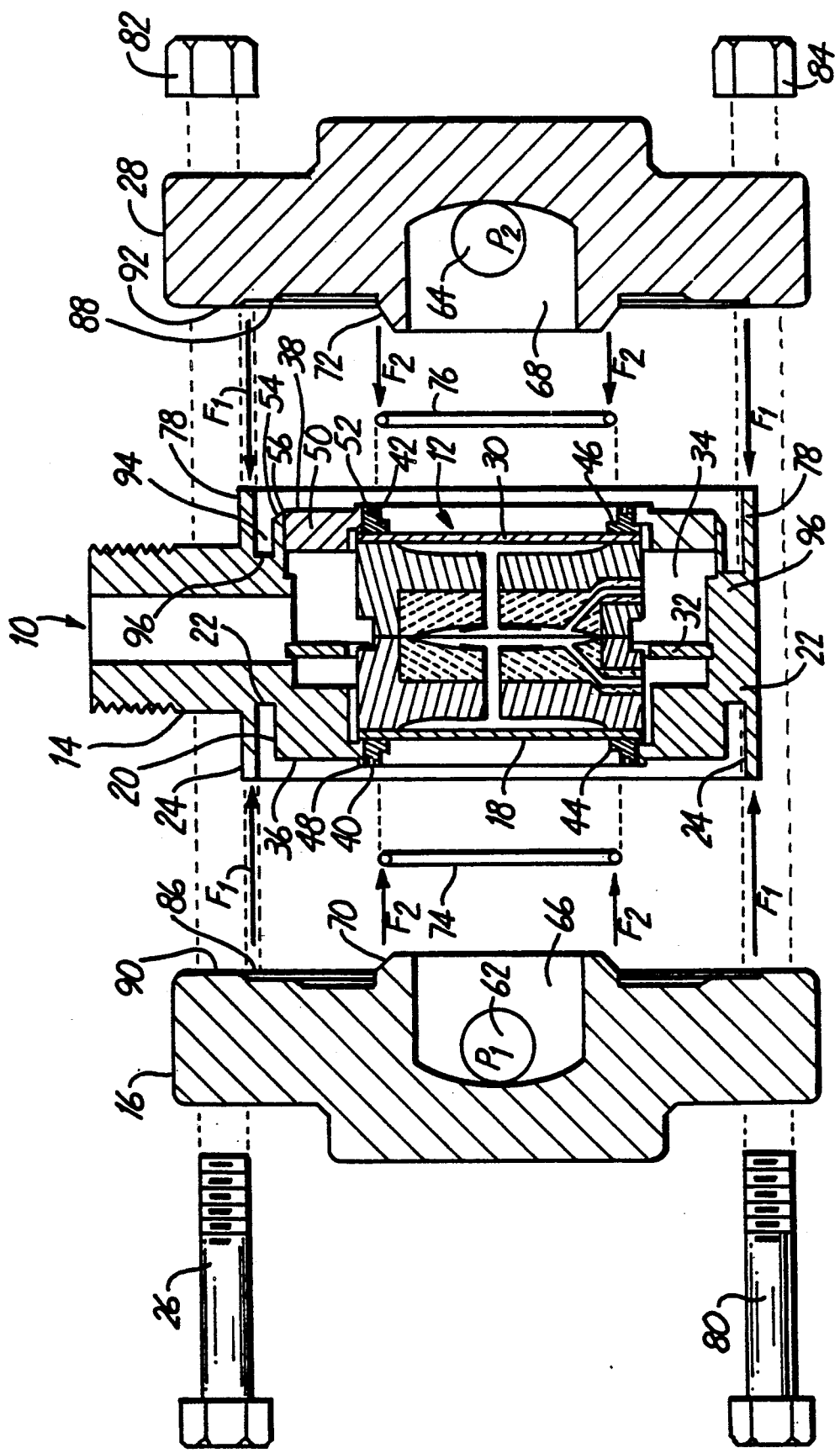
FIG. 2 shows an exploded sectional view of a portion of a pressure transmitter.

In FIG. 2 a portion of a differential pressure transmitter 10 is shown comprising a sensing transducer generally shown at 12, such as taught in U.S. Pat. No. 3,618,390 hereby incorporated by reference, residing in transmitter housing 14. Sensing transducer 12 converts a differential fluid pressure applied from flanges 16 and 28 across deflectable isolation diaphragms 18 and 30, respectively, to an electrical output representative of differential pressure. Circuitry on printed circuit board 32 residing in transmitter housing 14 couples the electrical output of sensing transducer 12 to internal transmitter circuitry (not shown) sealed from a potentially explosive environment and providing a pressure-output representative of sensed differential pressure $P_1-P_2$, such as a 4-20 mA DC current, a digital signal or a 1-5 Volt DC voltage.

Sensing transducer 12 resides in opening 34 defined in transmitter housing 14. Inner rims 36 and 38 encompass housing rings 40 and 42 having recesses 44 and 46, respectively. Housing ring 40 is welded to transmitter housing 14 at region 48 defined by opening 34. Housing ring 42 is welded to lid 50 at region 52. Lid 50 is also welded to interior rim 54 at region 56.

Flanges 16 and 28 couple fluid pressure $P_1$ and $P_2$ via passageways (not shown) extending from openings 62 and 64, respectively, to openings 66 and 68, respectively. Inner rims 70 and 72 defining openings 66 and 68, respectively, face corresponding recesses 44 and 46, respectively, to define corresponding gaps therebetween. Sealing rings 74 and 76 are disposed in the corresponding gaps to sealingly couple fluid pressure $P_1$ and $P_2$ from openings 66 and 68, respectively, to corresponding isolation diaphragms 18 and 30, respectively. Sealing rings 74 and 76, such as O-rings, typically comprise resilient material having a significantly lower modulus of elasticity than outer rims 4 and 78, as will be discussed below.

Four fastening bolts and four nuts, including bolts 26 and 80 disposed through a periphery of flanges 16 and 28 along with nuts 82 and 84 as shown, urge recesses 86 and 88 defined in flange outer rims 90 and 92, respectively, against corresponding outer rims 24 and 78, respectively, providing large clamping force $F_1$ to outer rims 24 and 78. Fastening bolts 26 and 80 along with nuts 82 and 84 are typically torqued to produce clamping force $F_1$ in excess of 3000 pounds, known as preloading, ensuring flanges 16 and 28 remain coupled to transmitter housing 14 when high line or differential pressure is applied to openings 62 and 64. Flange inner rims 70 and 72 compress sealing rings 74 and 76 with sealing force $F_2$. Since sealing rings 74 and 76 are resilient, sealing force $F_2$ is substantially smaller and more predictable than securing force $F_1$ and can be removed from pressure measurements through calibration.

Annular grooves 20 and 94 define flexure regions 22 and 96, respectively, in transmitter housing 14 encompassing inner rims 36 and 38, respectively, closely proximate a radial edge defining narrow and web-like outer rims 24 and 78, respectively. Preferably, outer rims 24 and 78 extend beyond planes defined by housing inner rims 36 and 38, respectively. Flexure regions 22 and 96 have reduced cross sectional areas with respect to outer rims 24 and 78, respectively. Grooves 20 and 94 are sufficiently deep such that outer rims 24 and 78 are deflectable about flexure regions 22 and 96, respectively, to substantially mechanically isolate stresses in outer rims 24 and 78 from inner rims 36 and 38, as well as sensitive portions of sensing transducer 12 including isolation diaphragms 18 and 30. Multiple grooves can be used to enhance the isolation effect, such as concentric grooves or a series of grooves end-to-end encompassing the isolation diaphragms.

Substantially no distortion occurs to transducer 12 or to housing inner rims 36 and 38 proximate housing rings 40 and 42, respectively, which are coupled to isolation diaphragms 18 and 30, respectively, as a result of clamping force $F_1$. Errors created by clamping force $F_1$ in pressure measurements of transducer 12 are substantially reduced such that the pressure output of sensing transducer 12 is more representative of actual differential fluid pressure $P_1-P_2$. Hence, narrowed flexure regions 22 and 96 and outer rims 24 and 78 substantially isolate sensing transducer 12 from clamping force $F_1$.

Transmitter housing 14, flanges 16 and 28 and bolts 26 and 80 usually comprise different materials having different thermal coefficients of expansion. These differences in thermal coefficients of expansion cause bolting forces from the four bolts including 26 and 80 to vary due to temperature changes of flange 16 and 28, housing 14 and bolts 26 and 80. Varying bolting forces cause clamping force $F_1$ to vary and be unevenly distributed to outer rims 24 and 78. Furthermore, flanges 16 and 28 and housing 14, having different thermal coefficients of expansion, change dimensions with temperature, creating a radial component in clamping force $F_1$ in outer rims 24 and 78. This radial force is usually hysteretic due to friction during slippage of abutting surface of flanges 16 and 28 and housing 14.

Distortions of sensing transducer 12 caused by large, uneven and hysteretic axial and radial clamping force $F_1$ are substantially reduced by the arrangement of outer rims 24 and 78 deflecting about flexure regions 22 and 96 as described above. Although sealing force $F_2$ can vary slightly with temperature, sealing force $F_2$ is substantially small and has substantially no effect on measurements of transducer 12. Hence, errors in pressure measurements of sensing transducer 12 due to differential thermal expansion of flanges 16 and 28, housing 14 and bolts 26 and 80 are substantially reduced.

Figure 3:
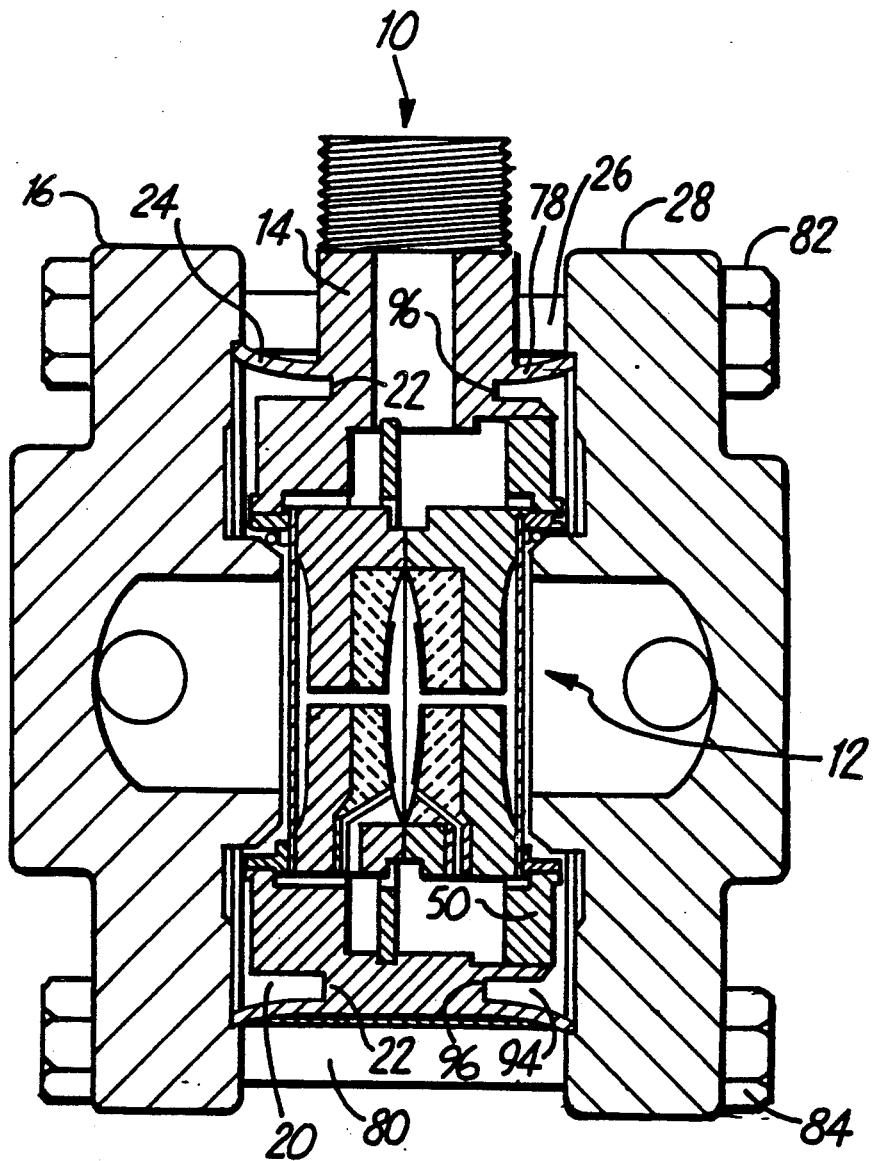
FIG. 3 is an assembled sectional view of a portion of the transmitter of FIG. 2.

In FIG. 3, an assembled sectional view of the first embodiment of the pressure transmitter is shown. As previously described, flanges 16 and 28 urge against and deflect outer rims 24 and 78 outward from sensing transducer 12 as previously described. For purposes of illustration, the deflections of outer rims 24 and 78 are shown exaggerated in FIG. 3. As illustrated, large axial and hysteretic radial components of clamping force $F_1$ varying with temperature are substantially isolated from sensing transducer 12, providing substantially more accurate pressure measurements.

Figure 4:
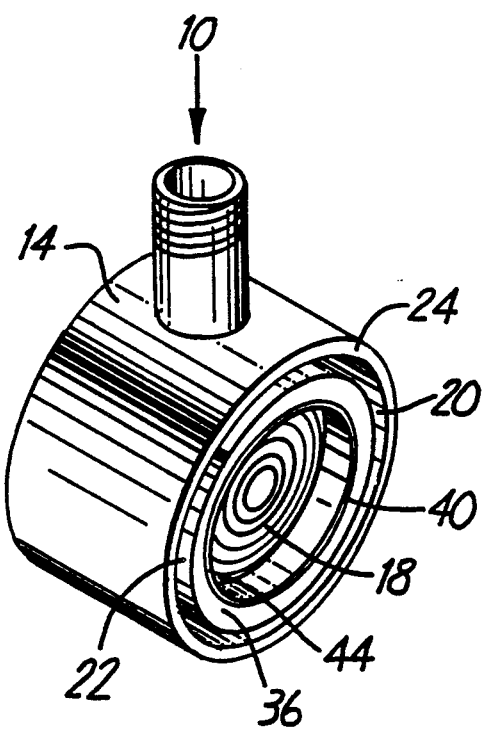
FIG. 4 is a perspective view of a portion of the transmitter of FIG. 2.

In FIG. 4, a perspective view of a portion of a differential pressure transmitter 10 is shown. Transmitter housing 14 is generally cylindrical with outer rim 24, groove 20, flexure region 22, inner rim 36, recess 44 and isolator diaphragm 18 each generally concentric with transmitter housing 14.

Figure 5:
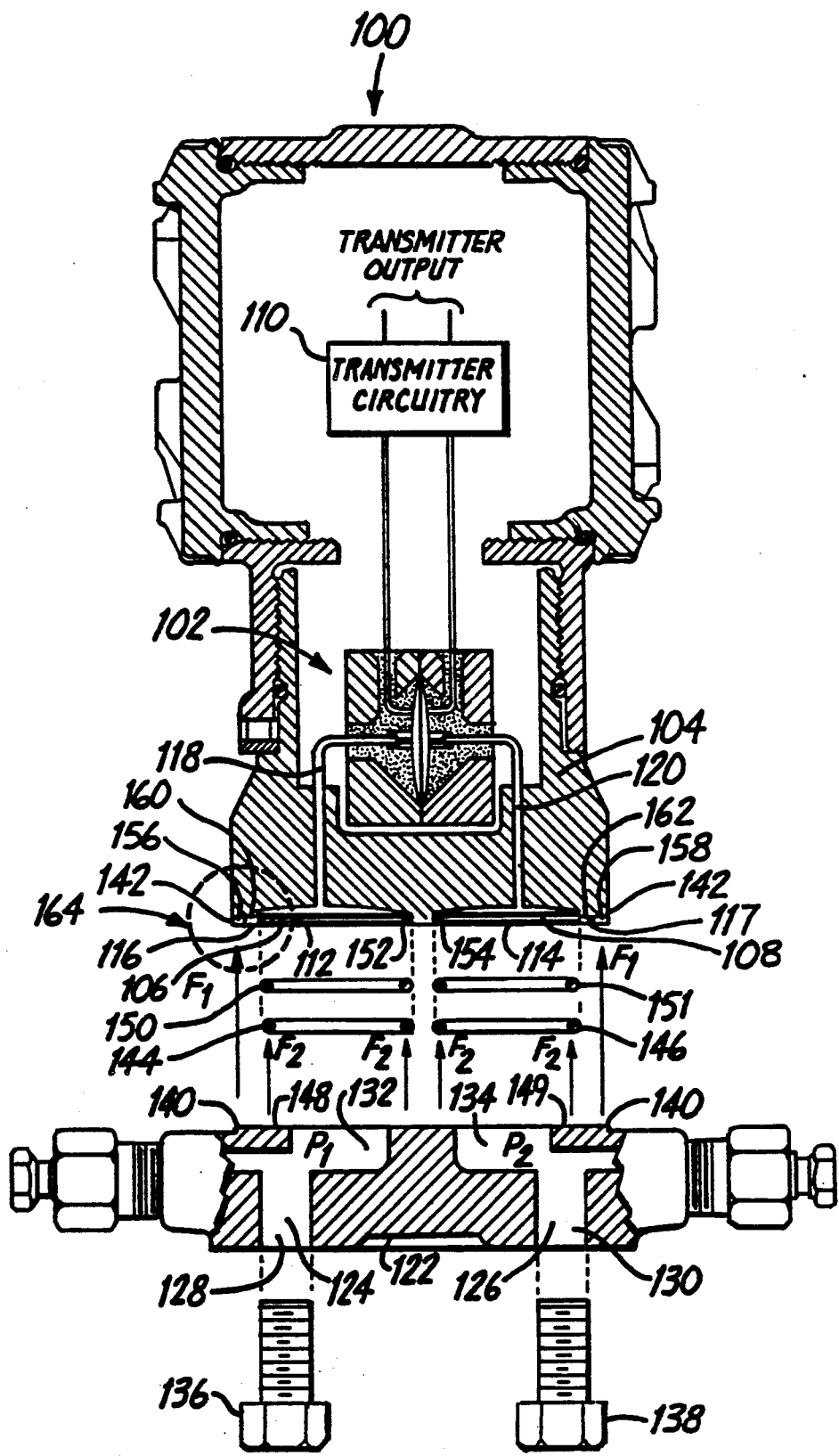
FIG. 5 is an exploded sectional view of a second embodiment of a pressure transmitter according to the invention.

In FIG. 5, a second preferred embodiment of a differential pressure transmitter 100 is shown. Sensing transducer 102, similar to sensing transducer 12 described in the first preferred embodiment, is disposed in transmitter housing 104 sensing differential pressure $P_1-P_2$ across deflectable isolator diaphragms 106 and 108, respectively. Transmitter circuitry 110, which is sealed from a potentially explosive atmosphere, couples to sensing transducer 102 and generates a transmitter output representative of differential pressure $P_1-P_2$ sensed by sensing transducer 102. Isolation diaphragms 106 and 108, forming a portion of transducer 102, sealingly extend across openings 112 and 114 defined by inner rims 116 and 117 and are substantially coplanar. Passageways 118 and 120 couple pressures $P_1$ and $P_2$, respectively, to sensing transducer 102.

Flange 122 couples fluid pressures $P_1$ and $P_2$ via passageways 124 and 126, respectively, from openings 128 and 130, respectively, to openings 132 and 134, respectively, corresponding to isolation diaphragms 106 and 108, respectively. Four fastening bolts including bolts 136 and 138 extend through a periphery of flange 122 urging flange outer rim 140 against corresponding housing outer rim 142 and applying a clamping force $F_1$ to outer rim 142. Resilient or plastic, such as PTFE, sealing rings 144 and 146 reside in gaps defined between flange inner rims 148 and 149 and weld rings 150 and 151, respectively, such as taught in U.S. Pat. No. 4,792,089 herein incorporated by reference, which are welded to corresponding recesses 152 and 54, respectively, encompassing isolation diaphragms 106 and 108, respectively. Flange inner rims 148 and 149 also provide a sealing force $F_2$ compressing sealing rings 144 and 146 to sealingly couple openings 132 and 134 to openings 112 and 114, respectively.

Separate grooves 156 and 158 in housing 104 define flexure regions 160 and 162, respectively, between housing outer rim 142 and inner rims 116 and 117 adjacent isolation diaphragms 106 and 108, respectively. Grooves 156 and 158 can also be intersecting, forming one continuous groove encompassing both inner rims 116 and 117, or comprising multiple parallel grooves to enhance the deflection effect. Grooves 156 and 158 are sufficiently deep such that clamping force $F_1$ deflects outer rim 142 about flexure regions 160 and 162. Similarly described in FIG. 1, transmission of large and unevenly distributed axial and radial components of clamping force $F_1$ are substantially reduced from outer rim 142 to inner rims 116 and 117 proximate isolation diaphragms 106 and 108, respectively, such that distortion of isolation diaphragms 106 and 108 are substantially reduced.

Further, housing 104 and flange 122 can comprise different materials having different thermal coefficients of expansion. Flange 122 slides across housing 104 as temperature changes due to differential expansion and contraction of housing 104 and flange 122. This sliding motion is hysteretic due to friction between the abutting surfaces of flange 122 and housing 104, generating a hysteretic radial component of clamping force $F_1$ in outer rim 142 of housing 104. This hysteretic radial force is substantially reduced by the configuration of outer rim 142 deflecting about flexure regions 160 and 162 to substantially reduce distortions to isolation diaphragms 106 and 108, respectively, similar to the first embodiment of the invention.

Sealing forces $F_2$ can be large, especially when using PTFE sealing rings 144 and 146, causing some deformation of isolation diaphragms 106 and 108, respectively. However, errors in pressure measurements due to this deformation can be removed through calibration because inner rims 116 and 117 and sealing rings 144 and 146 have substantially smaller surface areas than outer rim 142, and because PTFE has a lubricating effect such that hysteretic radial forces in sealing force $F_2$ due to slippage to flange 122 across sealing rings 144 and 146 and inner rims 116 and 117 are substantially small.

Figure 6:
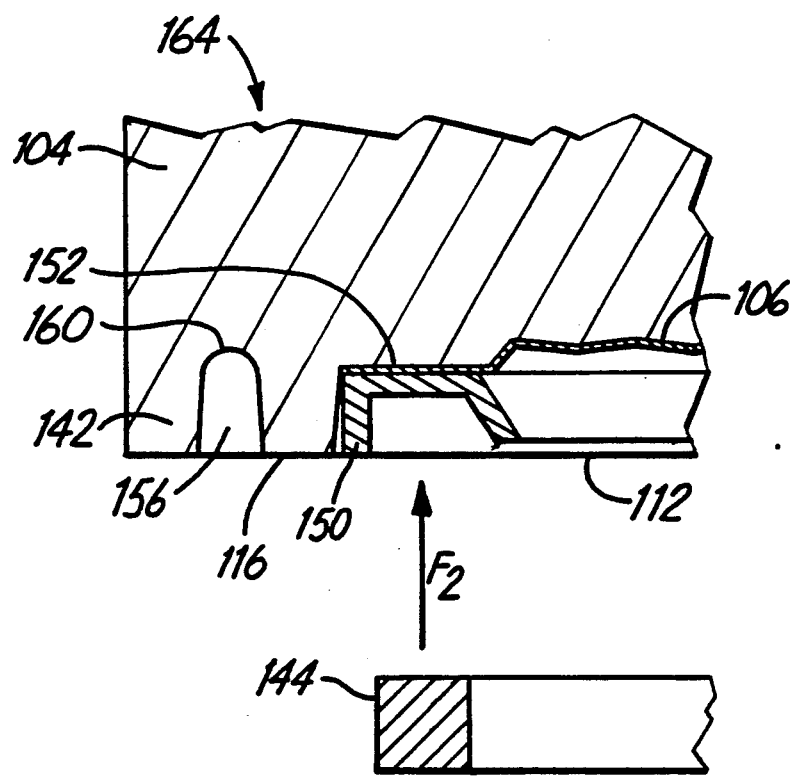
FIG. 6 is an enlarged sectional view of a portion of the transmitter of FIG. 5.

In FIG. 6 is an enlarged sectional view of region shown in FIG. 5.

In FIG. 7, a perspective view of pressure transmitter 100 is shown. Grooves 156 and 158 are defined between outer rim 142 and inner rims 116 and 117, respectively, which inner rims encompass isolation diaphragms 106 and 108, respectively. Grooves 156 and 158 are sufficiently deep such that outer rim 142 is deflectable about flexure regions 160 and 162 (not shown) to substantially reduce distortion to inner rims 116 and 117 and isolation diaphragms 106 and 108, respectively, due to large and uneven axial and hysteretic radial components of clamping force $F_1$ applied to outer rim 142 by flange 122. The depth of grooves 156 and 158 is ideally between one-fourth and one-half width "A" shown in FIG. 7, encompassing isolation diaphragms 106 and 108 as much as possible.

Although the present invention has been described with reference to preferred embodiments, workers skilled in the art will recognize that changes may be made in form and detail without departing from the spirit and scope of the invention.

What is claimed is:

1. A pressure transmitter for measuring a fluid pressure from a pressure source, comprising:

a housing having a housing outer rim encompassing a housing inner rim, the housing inner rim defining a housing opening;

means for sensing pressure disposed in the housing providing a sensor output and coupled to the housing opening;

flange means for coupling the fluid pressure to the means for sensing pressure having a flange outer rim abutting the corresponding housing outer rim, the flange means having a flange inner rim facing the corresponding housing inner rim and defining a recess therebetween, the flange means having a passageway communicating the fluid pressure from a first flange opening defined in the flange means to a second flange opening defined by the flange inner rim, the second flange opening coupling the fluid pressure to the means for sensing pressure;

sealing means disposed in the recess for sealing the housing inner rim to the flange inner rim;

securing means coupled to the flange means for securing the flange outer rim and housing outer rim together such that the housing outer rim receives a securing force from the flange outer rim and the housing inner rim receives a sealing force from the flange inner rim via the sealing means; and flexure means defined by at least one depression in the housing between the housing inner rim and the housing outer rim for reducing transmission of the securing force from the housing outer rim to the means for sensing pressure.

2. The transmitter as specified in claim 1 wherein the depression is sufficiently deep such that the housing outer rim is deflectable about the flexure means.

3. The transmitter as specified in claim 2 wherein the depression is closely proximate the housing outer rim.

4. The transmitter as specified in claim 3 wherein the depression is defined by at least one notch encompassing the housing inner rim.

5. The transmitter as specified in claim 3 wherein the depression is defined by at least one groove encompassing the housing inner rim.

6. The transmitter as specified in claim 4 wherein the sealing means is resilient.

7. The transmitter as specified in claim 6 wherein the securing force is larger than the sealing force, where the securing force is sufficiently large such that the flange inner rim remains sealed to the housing inner rim when the flange means couples fluid pressure to the means for sensing pressure.

8. The transmitter as specified in claim 7 wherein the flange outer rim encompasses a flange recess receiving the housing outer rim.

9. The transmitter as specified in claim 8 wherein the means for sensing pressure comprises a capacitive cell pressure transducer.

10. The transmitter as specified in claim 9 wherein the securing means comprises a fastener disposed through the flange means.

11. The transmitter as specified in claim 10 wherein the sealing means comprises resilient material.

12. The transmitter as specified in claim 11 wherein the housing inner rim, the groove and the housing outer rim are substantially concentric.

13. The transmitter as specified in claim 12 wherein the securing means comprises at least one bolt.

14. A pressure transmitter for measuring differential fluid pressure between first and second pressure sources having respective first and second fluid pressures, comprising:
a housing having a housing outer rim encompassing first and second housing inner rims, the first and second housing inner rims defining first and second housing openings, respectively;
first and second isolation diaphragms sealingly disposed across the first and second housing openings, respectively;
means for sensing pressure disposed in the housing providing a sensor output and coupled to the first and second isolation diaphragms;
flange means for coupling the first and second fluid pressures to the first and second isolation diaphragms, respectively, having a flange outer rim abutting the corresponding housing outer rim, the flange means having first and second flange inner rims facing the corresponding first and second housing inner rims and defining first and second recesses therebetween, respectively, the flange means having first and second passageways coupling the first and second fluid pressures from first and second flange openings defined in the flange means, respectively, to a third and fourth flange opening defined by the first and second flange inner rims, respectively, the third and fourth flange openings coupling the first and second fluid pressure to the first and second isolation diaphragms, respectively;
sealing means disposed in the first and second recess, respectively, for sealing the first and second housing inner rims to the first and second flange inner rims, respectively;
securing means coupled to the flange means for securing the flange outer rim and housing outer rim together such that the housing outer rim receives a securing force from the flange outer rim and the first and second housing inner rims receive first and second sealing forces, respectively, from the first and second flange inner rims, respectively, via the sealing means; and
flexure means defined by at least one depression in the housing between the first housing opening and the housing outer rim for reducing transmission of the securing force from the housing outer rim to the first isolation diaphragm means.

15. The transmitter as specified in claim 14 wherein the depression is sufficiently deep such that the housing outer rim is deflectable about the flexure means.

16. The transmitter as specified in claim 15 wherein the flexure means is further defined by at least one depression in the housing between the housing outer rim and the second isolation diaphragm means.

17. The transmitter as specified in claim 16 wherein the flexure means is further defined by at least one depression in the housing encompassing both the first and second isolation diaphragm means.

18. The transmitter as specified in claim 17 wherein surface area of the housing outer rim is greater than surface area of the first housing inner rim.

19. The transmitter as specified in claim 18 wherein the means for sensing pressure comprises a capacitive cell pressure transducer.

20. A pressure transmitter for measuring a fluid pressure from a pressure source, comprising:
a housing having a peripheral inner rim defining a housing opening;
means for sensing pressure disposed in the housing within the perimeter of the housing inner rim providing a sensor output and coupled to the housing opening;
flange means for coupling the fluid pressure to the means for sensing pressure and having a flange outer peripheral rim and a flange inner rim facing the corresponding housing inner rim, the flange means having a passageway communicating the fluid pressure from a first flange opening defined in the flange means to a second flange opening defined by the flange inner rim, the second flange opening coupling the fluid pressure to the means for sensing pressure;
sealing means for sealing the housing inner rim with respect to the flange inner rim when the flange is secured to the housing;
securing means for securing the flange and housing together with a securing force acting in a first direction; and
flexure means comprising a housing outer rim forming a narrow peripheral rim separated from the housing inner rim by at least one depression in the housing, the flange outer peripheral rim contacting the flange outer peripheral rim to flex the housing outer rim to react the securing force exerted by the securing means in the first direction for reducing transmission of the securing force from the housing outer rim to the means for sensing pressure.

21. The transmitter as specified in claim 21, wherein the housing outer rim extends generally parallel to the direction of securing force and has a dimension transverse to its extension that is substantially less than its length in the direction of the securing force.

* * * * *

UNITED STATES PATENT AND TRADEMARK OFFICE
CERTIFICATE OF CORRECTION

PATENT NO. : 5,094,109

DATED : March 10, 1992

INVENTOR(S) : MICHAEL J. DEAN, LEE A. MATTISON, TERRANCE F. KROUTH

It is certified that error appears in the above-identified patent and that said Letters Patent is hereby corrected as shown below:

Col. 3, line 49, delete "rims 4", insert "rims 24"

Signed and Sealed this

Seventeenth Day of August, 1993

Attest:

BRUCE LEHMAN

Attesting Officer

Commissioner of Patents and Trademarks